(12) United States Patent
Lo

(10) Patent No.: US 7,166,990 B2
(45) Date of Patent: Jan. 23, 2007

(54) BATTERY LOW-VOLTAGE PROTECTING DEVICE

(75) Inventor: Ka Yue Lo, Hong Kong (HK)

(73) Assignee: Kare Hong Kong Limited, Kowloon (HK)

( * ) Notice: Subject to any disclaimer, the term of this patent is extended or adjusted under 35 U.S.C. 154(b) by 436 days.

(21) Appl. No.: 10/843,302

(22) Filed: May 12, 2004

(65) Prior Publication Data

US 2004/0227492 A1 Nov. 18, 2004

(30) Foreign Application Priority Data

May 12, 2003 (CN) ................................. 03 1 03287
Feb. 17, 2004 (CN) ........................ 2004 1 0004371

(51) Int. Cl.
*H02J 7/06* (2006.01)
*H02H 7/18* (2006.01)
(52) U.S. Cl. ..................................... 320/155; 307/10.7
(58) Field of Classification Search ................ 320/155; 307/10.7
See application file for complete search history.

(56) References Cited

U.S. PATENT DOCUMENTS (Continued)

FOREIGN PATENT DOCUMENTS

CN 2093457 U 1/1992

(Continued)

OTHER PUBLICATIONS

Shen Wei et al. "Special Low Side Protect Switch MC3991 For Automobile," Oct. 1999, pp. 2-7.

*Primary Examiner*—Karl Easthom
*Assistant Examiner*—Richard V Muralidar
(74) *Attorney, Agent, or Firm*—Buchanan Ingersoll & Rooney PC

(57) ABSTRACT

A battery low-voltage protecting device is disclosed as including an input terminal connected, via a first lead wire and a switch driver circuit, with a positive terminal of a battery; an output terminal connected, via a second lead wire, with a load; a ground terminal connected, via a third lead wire, with an automobile body and a negative terminal of the battery; a declining voltage integrating circuit; a voltage detector; and a timer switch control circuit; in which the voltage of said declining voltage integrating circuit rises when the voltage of said battery rises, and falls when the voltage of said battery falls; and the declining voltage integrating circuit can differentiate between a quick fall in the voltage of the battery from a slow fall in the voltage of the battery, and output voltage signals to the voltage detector; and the voltage sensor can receive voltage signals outputted by the declining voltage integrating circuit, to compare the voltage signals with a pre-defined voltage level, and to output voltage signals to the switch driver circuit; and the timer switch control circuit can delay the battery low-voltage protecting device from performing voltage checking by a pre-defined period of time; and the switch driver circuit can selectively open and close the connection among the declining voltage integrating circuit, the load and the positive terminal of said battery, so that when the connection among the declining voltage integrating circuit, the load and the positive terminal of said battery is disconnected, the battery is completely disconnected from all electricity-consuming appliances of the automobile.

8 Claims, 3 Drawing Sheets

U.S. PATENT DOCUMENTS

| | | |
|---|---|---|
| 3,385,998 A | 5/1968 | Gold |
| 3,543,043 A | 11/1970 | Dunn |
| 4,270,057 A | 5/1981 | Holt |
| 4,493,001 A | 1/1985 | Sheldrake |
| 4,754,159 A | 6/1988 | Pointout et al. |
| 4,902,956 A | 2/1990 | Sloan |
| 5,089,762 A | 2/1992 | Sloan |
| 5,140,250 A | 8/1992 | Morland |
| 5,159,257 A | 10/1992 | Oka et al. |
| 5,200,877 A | 4/1993 | Betton et al. |
| 5,204,992 A | 4/1993 | Carpenter |
| 5,272,380 A | 12/1993 | Clokie |
| 5,315,228 A | 5/1994 | Hess et al. |
| 5,327,068 A | 7/1994 | Lendrum et al. |
| 5,522,034 A | 5/1996 | Watari et al. |
| 6,049,140 A | 4/2000 | Alksnat et al. |
| 6,087,737 A | 7/2000 | Alksnat et al. |
| 6,111,327 A | 8/2000 | Bae |
| 6,111,731 A * | 8/2000 | Cepynsky et al. ............ 361/23 |
| 6,133,645 A | 10/2000 | Scribner et al. |
| 6,166,454 A | 12/2000 | Schaller et al. |
| 6,320,351 B1 * | 11/2001 | Ng et al. .................... 320/104 |
| 6,424,511 B1 | 7/2002 | Levinas |
| 6,433,514 B1 | 8/2002 | McClure et al. |

FOREIGN PATENT DOCUMENTS

| | | |
|---|---|---|
| CN | 2239662 Y | 11/1996 |
| CN | 1152508 A | 6/1997 |
| CN | 1166422 | 10/1997 |
| CN | 2391992 Y | 8/2000 |
| DE | 42 34 551 C1 | 1/1994 |
| DE | 4234551 | 1/1994 |
| DE | 19824448 | 12/1999 |
| DE | 199 39 987 C1 | 1/2001 |
| DE | 19939987 | 1/2001 |
| EP | 0 736 950 A1 | 10/1996 |
| EP | 0 931 701 A2 | 7/1999 |
| GB | 2 341 985 A | 3/2000 |
| JP | 9-107639 A | 4/1997 |
| WO | WO 90/01435 | 2/1990 |
| WO | WO 01/17087 | 3/2001 |

* cited by examiner

Figure : 2

BATTERY LOW-VOLTAGE PROTECTING DEVICE

This invention relates to a battery low-voltage protecting device, in particular such a device for use in automobiles, e.g. motor cars and motorcycles, for protecting the automobiles by analyzing whether the fall in electric voltage is quick or slow, to thereby prevent excessive discharge by the battery.

BACKGROUND OF THE INVENTION

Although the widespread use of motor cars and motorcycles has brought about much convenience, there are problems associated with their use. For example, if the driver, after parking the car, forgets to switch off all the electrical appliances of the car, e.g. lighting devices in the car or parking lights on the car, such electrical appliances will consume electricity from the battery. When, after a period of time, the driver wishes to activate the engine, he/she may find that the battery in the car cannot provide sufficient electricity to activate the engine. If such a situation often occurs, servicing of the battery may be required, or the battery may even have to be replaced, thus bringing inconvenience and additional outgoings, in terms of both time and money, to the driver or owner of the car.

In the hope of solving the above problem, the following battery low-voltage protectors have been proposed. U.S. Pat. No. 5,200,877 entitled "Battery Protection System" discloses a set of electrical switches and a control process. In use, a system according to this patent will, after a pre-defined period of time and irrespective of whether the drop in voltage of the battery is quick or slow, check whether the battery voltage is below a pre-determined level. If the battery voltage is below the pre-determined level, the system will then cut off the electrical connection between the battery and the load, i.e. electrical appliances, starter and various electricity-consuming devices of the car. However, if, before the expiration of the pre-defined period of time, there has been a large output of electricity, the battery may well be exhausted, thus defeating the purpose of the protection system. In addition, in a system according to this patent, when the battery is cut off from the load, the electrical switches are still connected with the battery, which means that the battery is still in an electricity-discharging state. There is thus still the possibility of exhausting the electricity supply of the battery, preventing activation of the engine.

U.S. Pat. No. 6,424,511 entitled "Automotive Battery Disconnect Device" discloses a design, principle and control devices for electrical switches, in which, again, there is still the problem that when the battery is electrically cut off from the load, the positive terminal of the battery is not totally cut off, and thus still in an electricity-discharging state.

U.S. Pat. No. 4,493,001 entitled "Motor Vehicle Battery Rundown Protection System" discloses a circuit design and principle of a set of electrical switches and controller, in which, similarly, there remains the problem that when the battery is electrically cut off from the load, the positive terminal of the battery is not totally cut off, and thus still in an electricity-discharging state. In addition, a system according to this patent is not easy to install.

The system disclosed in U.S. Pat. No. 5,272,380 entitled "Electrical Supply Control System for a Motor Vehicle" is, again, not easy to install and suffers from the problem that the battery is still connected with electricity-consuming appliances even when the battery is disconnected from the load.

The device disclosed in U.S. Pat. No. 5,315,228 entitled "Battery Charge Monitor and Fuel Gauge" cannot differentiate between a quick and a slow fall in the battery voltage, and thus cannot overcome the problem of not being able to normally activate the engine.

Furthermore, the above proposals do not provide any testing device allowing the user/driver to test whether the relevant devices are in normal working conditions, or any display device informing the user/driver of the current working condition of the devices.

It is thus an object of the present invention to provide a low-voltage protecting device in which the aforesaid shortcomings are mitigated, or at least to provide a useful alternative to the public.

A further object of the present invention is to provide a battery low-voltage protecting device which can totally disconnect the electrical connection between the battery and all electricity-consuming appliances of the car, thus maintaining the voltage level of the battery. Such a device is easy to install and can determine whether to effect such a disconnection, depending on the rate of fall of the voltage level of the battery.

A yet further object of the present invention is to provide a battery low-voltage protecting device which, after installation, allows tests to be conducted, and includes display device indicating whether such is in normal working conditions.

SUMMARY OF THE INVENTION

According to the present invention, there is provided a battery low-voltage protecting device including an input terminal connected, via a first lead wire and a switch driver circuit, with a positive terminal of a battery; an output terminal connected, via a second lead wire, with a load; a ground terminal connected, via a third lead wire, with an automobile body and a negative terminal of said battery; a declining voltage integrating circuit; a voltage detector; and a timer switch control circuit; wherein the voltage of said declining voltage integrating circuit is adapted to rise when the voltage of said battery rises, and is adapted to fall when the voltage of said battery falls; wherein said declining voltage integrating circuit is adapted to differentiate between a quick fall in the voltage of the battery from a slow fall in the voltage of the battery, and to output voltage signals to said voltage detector; wherein said voltage detector is adapted to receive voltage signals outputted by said declining voltage integrating circuit, to compare said voltage signals with a pre-defined voltage level, and to output voltage signals to said switch driver circuit; wherein said timer switch control circuit is adapted to delay said battery low-voltage protecting device from performing voltage checking by a pre-defined period of time; and wherein said switch driver circuit is adapted to selectively open and close the connection among said declining voltage integrating circuit, said load and said positive terminal of said battery, whereby when said connection among said declining voltage integrating circuit, said load and said positive terminal of said battery is disconnected, said battery is completely disconnected from all electricity-consuming appliances of said automobile.

BRIEF DESCRIPTION OF THE DRAWINGS

A preferred embodiment of the present invention will now be described, by way of example only, with reference to the accompanying drawings, in which.

DETAILED DESCRIPTION OF THE PREFERRED EMBODIMENT

Figure 1:
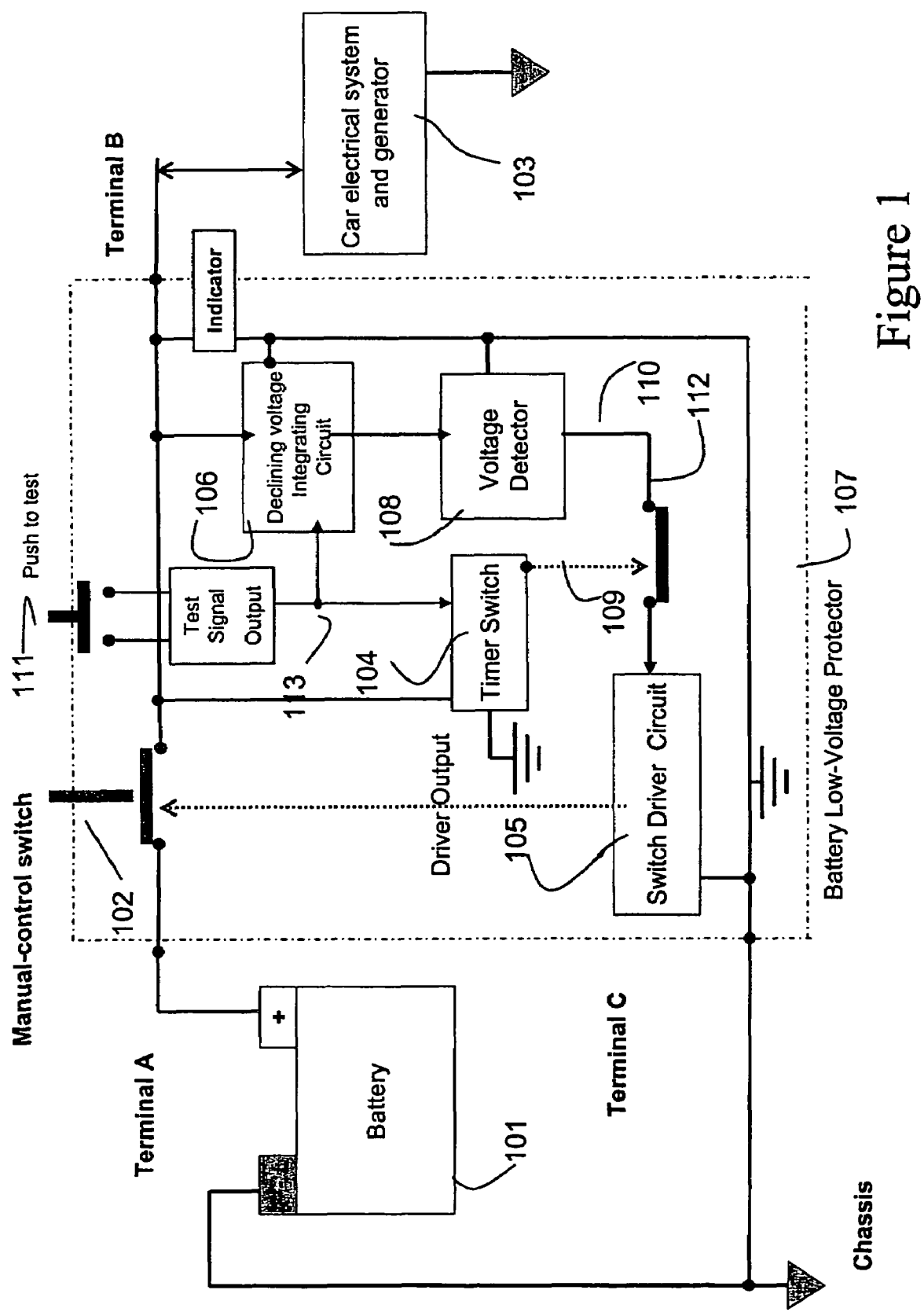
FIG. 1 is a schematic diagram showing the use of a battery low-voltage protecting device according to the present invention.

As shown in FIG. 1, a battery low-voltage protector 107 according to the present invention has three lead wires A, B, C. The lead wire A of the input terminal is connected with the positive terminal of a battery 101; the lead wire B of the output terminal is connected with the electrical system and electric generator 103, which represents the load, of a car or motorcycle; and the lead wire C of the ground terminal is connected with the car body and the negative terminal of the battery 101.

As shown in FIG. 1, the battery low-voltage protector 107 includes declining voltage integrating circuit (DVIC) 106, a voltage detector 108, a timer switch control circuit 104, a switch driver circuit 105, a display device and testing device 113.

Figure 3:
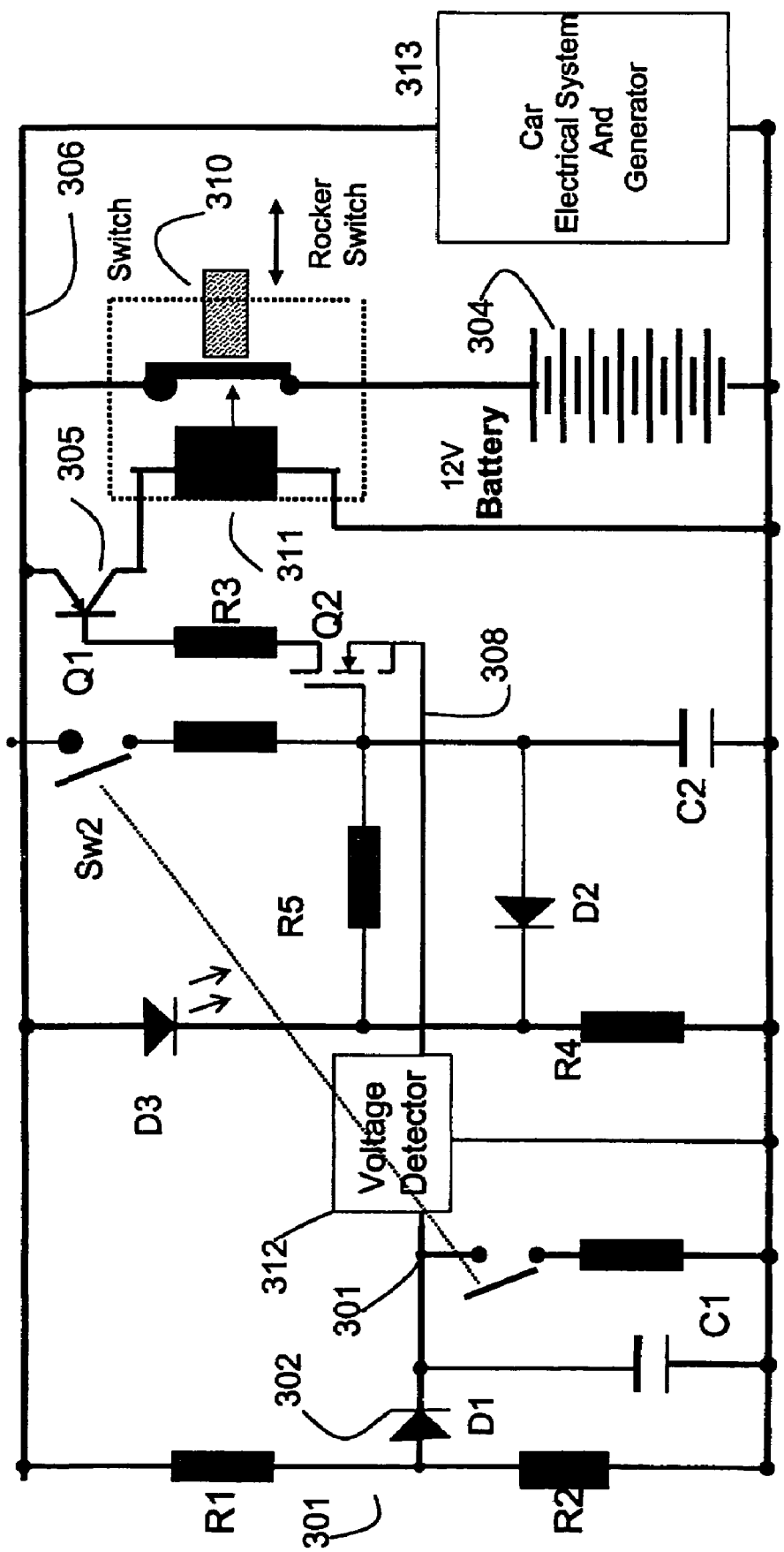
FIG. 3 is an exemplary circuit diagram of the battery low-voltage protecting device shown in FIG. 1.

As shown in FIG. 3, the main function of the DVIC 106 is to determine the voltage of the battery 101. The voltage of the DVIC 106 will rise when the voltage of the battery 101 rises, and will fall when the voltage of the battery 101 falls. At the same time, the DVIC 106 will output signals of the variation in the voltage level to the voltage detector 108. The DVIC 106 is made up of a diode D1, a capacitor C1, and two resistors R1, R2. When the voltage of the battery 101 falls, the voltage of the capacitor C1 (the voltage between the resistors R1, R2) will also fall, and the fall of the voltage of the capacitor C1 will lag behind the fall of the voltage of the battery 101 by around less than one minute, e.g. by a period of time of from 2 to 60 seconds. Thus, if there is a quick variation of the voltage level of the battery 101, it will take a certain period of time before the voltage of the DVIC 106 approaches the voltage level of the battery 101. In this example, if there is a quick drop in the voltage of the battery 101, it will take around one minute for the device to control the switch driver circuit 105 to disconnect the battery 101 from the load of the car. The starter of the motor car or motorcycle can be activated within this around one minute of time, thus enabling rapid recharge of the battery 101. In this manner, the voltage level of the battery 101 can be maintained, and can in fact be raised during recharge. The voltage of the DVIC 106 will rise accordingly. If, on the other hand, the fall in the voltage of the battery 101 is relatively slow, the speed of fall of the voltage of the DVIC 106 will be generally the same as that of the fall of the voltage of the battery 101. Thus, when the voltage of the battery 101 falls slowly, the voltage of the DVIC 106 will also fall at the same time, and output signals of the variation in the voltage level to the voltage detector 108, which will in turn control the switch driver circuit 105 to cut off the electrical connection with the positive terminal of the battery 101.

The voltage detector 108 is connected between the DVIC 106 and the switch driver circuit 105, and the switch driver circuit 105 is connected between the battery low-voltage protector 107 and the positive terminal of the battery 101. The voltage detector 108 is mainly for receiving voltage signals from the DVIC 106, and immediately output signals to the switch driver circuit 105, via a field effect transistor Q2, a resistor R3 and a transistor Q1, to instantly cut off the electric power source. The voltage detector 108 may be a chip produced by Seiko Instrument and sold under the model series No. S-808/9.

The switch driver circuit 105 includes a driver circuit and an electromagnetic force supplementary switch. There are a number of suitable driver circuits in the market, whereas the supplementary force supplementary switch may be one produced by Omron and traded under Model No. A8G or one produced by Matsushita and traded under Model No. AJ8R. As the switch driver circuit 105 is positioned between the battery low-voltage protector 107 and the positive terminal of the battery 101, it is possible to disconnect the battery 101 from all electricity-consuming devices by opening the switch driver circuit 105.

The timer switch control circuit 104 comprises a capacitor C2, resistors R5, R4, an LED indicator D3, a diode D2 and the field effect transistor Q2. The resistor R4 is connected in series with the resistor R5 and the diode D2, in which the resistor R5 and the diode D2 are connected in parallel. The timer switch control circuit 104 is capable of suspending the operation of the battery low-voltage protector 107 by around eight to fifteen minutes, thus giving time for the driver to activate the engine. If the engine cannot be activated within this time, the battery low-voltage protector 107 will resume its function automatically.

The display device is an indicating light D3 connected in parallel with the DVIC 106.

The testing device 113 is a test switch SW2 and resistor connected between the DVIC 106 and the voltage detector 108. When the test switch SW2 is closed, it will directly output a voltage signal which is below a pre-determined voltage level to the voltage detector 108, whereupon the voltage detector 108 will output signals, via the field effect transistor Q2, the resistor R2 and the transistor Q1, to control the switch driver circuit 105 to disconnect the positive terminal of the battery 101.

Figure 2:
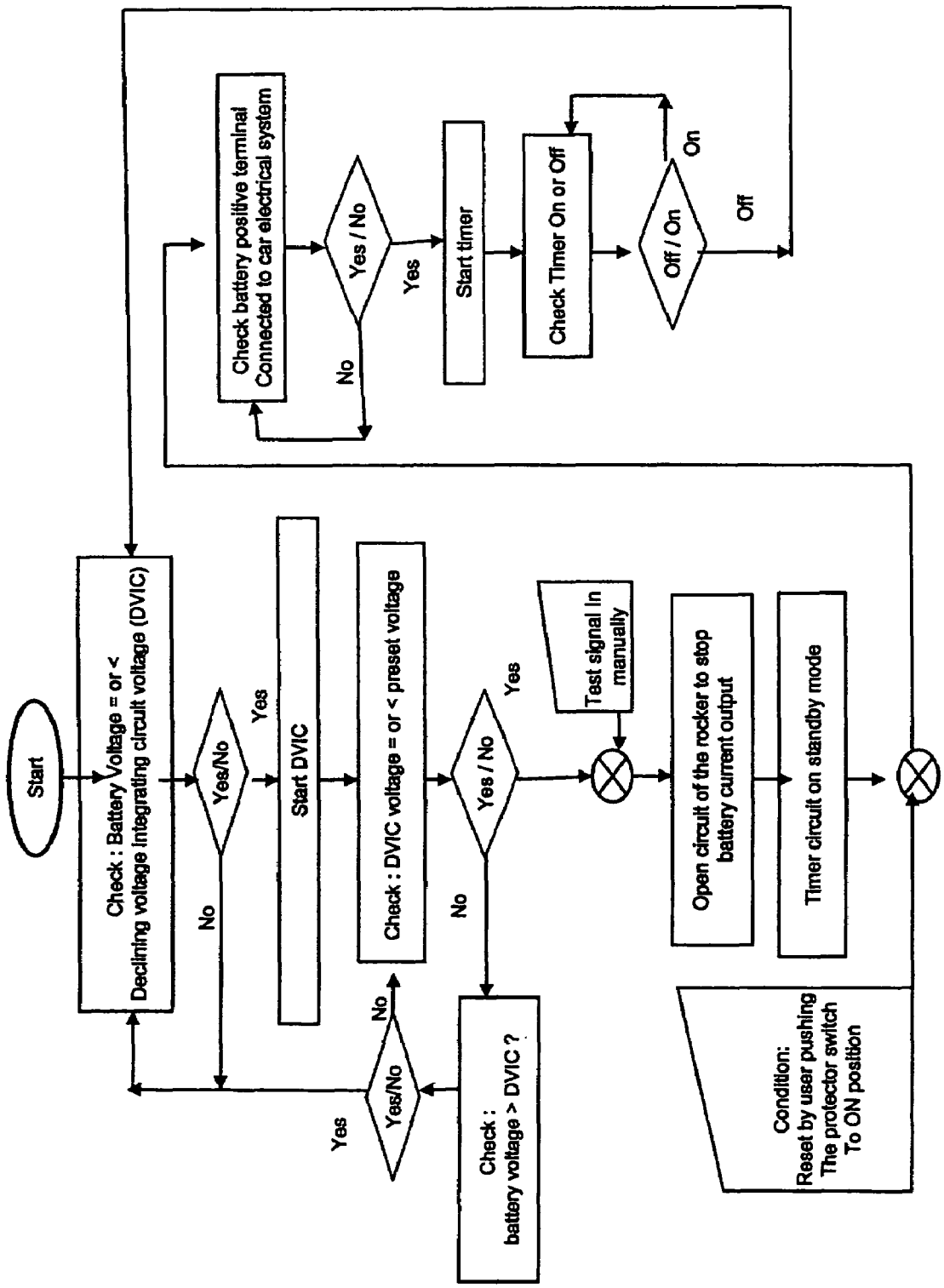
FIG. 2 is a flow chart showing the operation of the battery low-voltage protecting device shown in FIG. 1.

As shown in FIG. 2, the battery low-voltage protecting device according to this invention works in the following manner. When the battery low-voltage protector 107 is connected with the battery 101, the electrical system in the car and electric generator 103 and the ground (the negative terminal of the battery 101) via the lead wires A, B and C respectively, it is in a normal working condition. It will firstly check whether the electric voltage of the battery 101 is equal to or smaller than the electric voltage of the DVIC 106. If this is the case, the electric voltage of the DVIC 106 will fall accordingly, and the DVIC 106 will output voltage signals to the voltage detector 108. The voltage detector 108 will then compare the received voltage signals with a pre-determined voltage value (e.g. 11.7V). If the received voltage signals are equal to or below this pre-determined voltage value, it will activate the switch driver circuit 105 to disconnect the battery 101. If, on the other hand, this is not the case, it will continue with monitoring and checking the electric voltage of the battery 101.

In the process discussed above, if the speed/rate of fall of the electric voltage of the battery 101 is slow, the speed/rate of fall of the voltage of the DVIC 106 will be the same as that of the fall of the voltage of the battery 101. It is thus possible to immediately activate, via the voltage detector 108, the switch driver circuit 105 to disconnect the positive terminal of the battery 101. If the speed of fall of the electric voltage of the battery 101 is quick, e.g. when activating the starter, the fall of the voltage of the DVIC 106 will lag behind that of the fall of the voltage of the battery 101 by less than one minute. In this case, even though the voltage of the battery 101 falls, the voltage detector 108 will not at the same time, activate, via the voltage detector 108, the switch driver circuit 105 to disconnect the positive terminal of the battery 101. When the voltage of the DVIC 106 starts to fall, the engine 103 will have been activated, and will raise the voltage of the battery 101. The voltage of the DVIC 106 will also rise. The switch driver circuit 105 will therefore not disconnect the positive terminal of the battery 101, thus ensuring the normal operation of the electrical system and starter 103 of the car.

In the above process, if the switch driver circuit 105 of the battery low-voltage protector 107 disconnects the positive terminal of the battery 101 because of a slow fall in the voltage of the battery 101, the driver may press the switch driver circuit 105 to connect the battery 101 with the battery low-voltage protector 107 and the electrical system and starter 103, so as to immediately activate the engine. At this time, the timer switch control circuit 104 in the battery low-voltage protector 107 can suspend the cut-off function of the battery low-voltage protector 107 by eight to fifteen minutes, allowing sufficient time to activate the engine.

As the battery low-voltage protecting device according to this invention is provided with a display device and testing device, it is possible to clearly show whether the protecting device is in normal working conditions. In particular, when the indicating light of the protecting device is on, it shows clearly that the battery 101 is of sufficient electric capacity, but when the indicating light is off, a driver may directly press the switch driver circuit 105 to activate the engine.

In addition, because of the existence of the testing device 113, it is possible, at any time, to test the operation of the protecting device. When testing, one only has to press the test switch SW2, whereby a voltage signal below a pre-set voltage value will be transmitted to the voltage detector 108, which will in turn disconnect the battery 101 by controlling the operation of the switch driver circuit 105. When operation of the protecting device is to be resumed, it is only necessary to press the switch driver circuit 105 back to the closed position.

It should be understood that the above only illustrates an example whereby the present invention may be carried out, and that various modifications and/or alterations may be made thereto without departing from the spirit of the invention. It should also be understood that certain features of the invention, which are, for brevity, described here in the context of a single embodiment, may be provided separately or in any appropriate sub-combinations.

What is claimed is:

1. A battery low-voltage protecting device including:
    an input terminal connected, via a first lead wire and a switch driver circuit, with a positive terminal of a battery;
    an output terminal connected, via a second lead wire, with a load;
    a ground terminal connected, via a third lead wire, with an automobile body and a negative terminal of said battery;
    a declining voltage integrating circuit;
    a voltage detector; and
    a timer switch control circuit;
    wherein the voltage of said declining voltage integrating circuit is adapted to rise when the voltage of said battery rises, and is adapted to fall when the voltage of said battery falls;
    wherein said declining voltage integrating circuit is adapted to differentiate between a quick fall in the voltage of the battery from a slow fall in the voltage of the battery, and to output voltage signals to said voltage detector;
    wherein said voltage detector is adapted to receive voltage signals outputted by said declining voltage integrating circuit, to compare said voltage signals with a pre-defined voltage level, and to output voltage signals to said switch driver circuit;
    wherein said timer switch control circuit is adapted to delay said battery low-voltage protecting device from performing voltage checking by a pre-defined period of time; and
    wherein said switch driver circuit is adapted to selectively open and close the connection among said declining voltage integrating circuit, said load and said positive terminal of said battery, whereby when said connection among said declining voltage integrating circuit, said load and said positive terminal of said battery is disconnected, said battery is completely disconnected from all electricity-consuming appliances of said automobile.

2. A device according to claim 1 wherein said declining voltage integrating circuit includes a diode whose fall in voltage lags behind the fall in voltage of said battery by less than one minute, said diode being connected in series with a plurality of electronic components, said electronic components including two resistors connected with each other in series and a capacitor connected in parallel with said two resistors, and wherein the voltage between said two resistors comprises the voltage signals outputted by said declining voltage integrating circuit.

3. A device according to claim 1 wherein the voltage detector is connected between said declining voltage integrating circuit and said switch driver circuit, and said voltage detector is adapted, when the voltage signals outputted by said declining voltage integrating circuit is equal to or smaller than said pre-defined voltage level, to output voltage signals to open said switch driver circuit through a triode.

4. A device according to claim 1 wherein said switch driver circuit includes an electromagnetic force supplementary switch.

5. A device according to claim 1 wherein said timer switch control circuit is adapted to temporarily suspend output of voltage signals by said declining voltage integrating circuit by eight to fifteen minutes, to thereby allow activation of engine of said automobile.

6. A device according to claim 1 wherein said timer switch control circuit includes a transistor connected in series with a first and a second resistors, a diode and a capacitor, wherein first resistor is connected with said diode in parallel, and are then connected in series with said second resistor.

7. A device according to claim 1 wherein a lighting member is connected in parallel with said declining voltage integrating circuit.

8. A device according to claim 1 wherein a test switch is connected between said declining voltage integrating circuit and said voltage detector, and wherein when said test switch is closed, a voltage signal of lower than said pre-defined voltage level is transmitted to said voltage detector to control said switch driver circuit to be disconnected from said positive terminal of said battery.

* * * * *